United States Patent [19]

Tojo et al.

[11] Patent Number: 5,206,305
[45] Date of Patent: Apr. 27, 1993

[54] CHLORINATED ETHYLENE-ALPHA-OLEFIN COPOLYMER RUBBER AND COMPOSITION THEREOF

[75] Inventors: Tetsuo Tojo; Keiji Okada; Yoshiharu Kikuchi, all of Ichihara; Yasuhiko Otawa, Tokyo; Toshiyuki Maeda, Tokyo; Katsuo Okamoto, Tokyo, all of Japan

[73] Assignee: Mitsui Petrochemical Industries, Ltd., Tokyo, Japan

[21] Appl. No.: 686,381

[22] Filed: Apr. 17, 1991

[30] Foreign Application Priority Data

Apr. 17, 1990 [JP] Japan .................................. 2-99392
Jun. 29, 1990 [JP] Japan .................................. 2-171677

[51] Int. Cl.$^5$ ............................................. C08F 8/22
[52] U.S. Cl. .............................. 525/331.7; 525/334.1; 525/355; 525/356
[58] Field of Search ................... 525/331.7, 334.1

[56] References Cited

U.S. PATENT DOCUMENTS

| 4,547,554 | 10/1985 | Kadomatsu et al. | 525/334.1 |
| 4,704,439 | 11/1987 | Yamaoka et al. | 525/334.1 |
| 4,725,506 | 2/1988 | Nagano | 525/334.1 |
| 4,814,390 | 3/1989 | Tojo et al. | 525/331.7 |

Primary Examiner—Bernard Lipman
Attorney, Agent, or Firm—Sherman and Shalloway

[57] ABSTRACT

Chlorinated ethylene-α-olefin copolymer rubber of the present invention is characterized in that the content of chlorine bonded to primary carbon atom is 0.6 % by weight or more and the content of chlorine bonded to tertiary carbon atom is 1.6 % by weight or less. This chlorinated ethylene-α-olefin copolymer rubber has a high vulcanization speed and excels in heat resistance. Additionally, this thermoplastic elastomer composition consisting of this vulcanizate and crystalline polyolefin resin particularly excels in moldability and processibility.

17 Claims, No Drawings

CHLORINATED ETHYLENE-ALPHA-OLEFIN COPOLYMER RUBBER AND COMPOSITION THEREOF

BACKGROUND OF THE INVENTION (1) Field of the Invention

The present invention relates to chlorinated ethylene-α-olefin copolymer rubber and composition thereof. More particularly, the present invention relates to chlorinated ethylene-α-olefin copolymer rubber which has excellent processibility, heat resistance, and rubber elasticity, and is very useful for extending the service life of rubber products and compositions of said copolymer rubber.

(2) Description of the Prior Art

Chlorinated ethylene-α-olefin copolymer is already known. For example, it is disclosed in Rubber Chem. Technol. 49 353 (1976), Japanese Laid-Open Application No. 60-99149, and Japanese Laid-Open Application No. 1-182340. Although the aforementioned conventional chlorinated ethylene-α-olefin copolymer rubber is a rubber excelling in ozone resistance and heat aging resistance, it poses problems such that one having a high vulcanization speed is inferior in heat resistance, while another having good heat resistance gives a low vulcanization speed, hence poor processibility, and a poor rubber elasticity.

SUMMARY OF THE INVENTION

It is the object of the present invention to provide a novel chlorinated ethylene-α-olefin copolymer rubber and compositions thereof which are capable of resolving the aforementioned problems, have high vulcanization speed, and excel in thermal stability, heat aging resistance and rubber elasticity.

According to the present invention, there is provided a chlorinated ethylene-α-olefin copolymer rubber which is characterized in that it has a chlorine content between 20 and 40 % by weight, the amount of chlorine bonded to the primary carbon of 0.6 % by weight or more, and the amount of chlorine bonded to the tertiary carbon of 1.6% by weight or less on the basis of chlorinated ethylene-α-olefin copolymer rubber, and the Mooney viscosity $ML_{1+4}(121°\ C.)$ between 10 and 190.

DETAILED DESCRIPTION OF THE INVENTION

Ethylene-α-olefin copolymer rubber

Ethylene-α-olefin copolymer rubber used for the synthesis of chlorinated ethylene-α-olefin copolymer rubber of the present invention is as follows.

For α-olefin to be used, the ones having carbon numbers between 4 and 20 are selected. There can be mentioned as examples of such α-olefins 1-butene, 4-methyl-pentene-1, hexene, octene, decene and dodecene. Of those α-olefins, 1-butene and 1-hexene are preferred.

The composition ratio (ethylene/α-olefin) between the ethylene units and the α-olefin units in ethylene-α-olefin copolymer rubber is 85/15 to 95/5 in mol, or preferably 89/11 to 93/7.

Ethylene-α-olefin copolymer rubber is a rubber-like polymer obtained by random copolymerization of the aforementioned components, and it per se is manufactured by some known process.

While the molecular weight of ethylene-α-olefin copolymer rubber is determined by the Mooney viscosity of chlorinated ethylene-α-olefin copolymer rubber, the one to be used in the present invention is normally selected from among those which have an intrinsic viscosity ($\eta$) in decalin at 135° C. falling within the range of from 0.5 to 6.0 as unchlorinated ethylene-α-olefin copolymer rubber.

Chlorinated ethylene-α-olefin copolymer rubber

Chlorinated ethylene-α-olefin copolymer rubber of the present invention is obtained by chlorinating ethylene-α-olefin copolymer rubber produced in the aforementioned procedures. The chlorination of ethylene-α-olefin copolymer rubber is caused to take place by dissolving copolymerized rubber in a solvent and by allowing the solute to contact molecular chlorine in the presence of light or an organic peroxide as the catalyst. There can be mentioned as examples of such solvents carbon tetrachloride, chloroform, cyclohexane, trichloroethane, tetrachloroethylene, silicon tetrachloride and nitromethane. Among the aforementioned compounds, carbon tetrachloride and chloroform are preferred for reasons of stability against chlorine and safety.

Treatment after chlorination is usually carried out in the following procedure. There can be mentioned a method such that first, the solution is degassed to purge molecular chlorine and hydrogen chloride from the solution, it is poured into a poor solvent for chlorinated ethylene-α-olefin copolymer rubber such as methanol, the precipitate is filtered out to be washed with said poor solvent and then dried, or said solvent is formed into a film and the solvent is removed with heating. Adjustment of the degree of chlorination is performed by adjusting the quantity of molecular chlorine supplied, the reaction time, the reaction temperature and/or the quantity of catalyst. Chlorinated ethylene-α-olefin copolymer rubber (hereinafter sometimes simply referred to as "chlorinated rubber") of the present invention has a chlorine content between 20 and 40 % by weight, or preferably between 25 to 35 % by weight. Well-balanced good properties are given with respect to ozone resistance, heat resistance, oil resistance, flame resistance, adhesive property and rubber elasticity with the chlorine content being controlled within said range.

So long as the chlorine content is lower than said range, such effects, for examples, oil resistance and adhesive property, that can be expected from the chlorination no longer come into play. If the chlorine content is higher than said range, melt flow drops and moldability and processibility deteriorate accordingly.

The chlorinated rubber of the present invention has a Mooney viscosity $[ML_{1+4}(121\ °\ C.)]$ between 10 and 190, or preferably between 20 and 150, or most desirably between 30 and 120, and imparts good moldability and processibility.

In case the Mooney viscosity is lower than said range, the rubber gives only an insufficient strength. On the contrary, if the Mooney viscosity is higher than said range, the melt flow drops, thus impairing moldability and processibility, and the miscibility with other kinds of rubber and resin drops.

Furthermore, it is very important that the content of chlorine bonded to the primary carbon atoms out of the chlorine atoms in said chlorinated rubber is 0.6% by weight or more on the basis of said chlorinated rubber, or preferably 0.7% by weight; or more and the content of chlorine bonded to the tertiary carbon atoms is 1.6% by weight or less, or preferably 1.4 % by weight or less. If the content of chlorine bonded to the primary carbon atom is less than 0.6% by weight, the vulcanization speed drops to the extent that such rubber is no longer suitable for practical use.

If the content of chlorine bonded to the tertiary carbon atoms is in excess of 1.6% by weight, an undesirable effect arises such that heat resistance is impaired.

The chlorinated rubber of the present invention having said chlorine content is prepared, using said ethylene-α-olefin copolymer rubber, by adequately adjusting the kind of solvent, the concentration of the reaction solvent and the reaction temperature. As for the solvent, the intended object cannot be achieved unless a solvent having a small radical solvation effect is used. As such solvents, there can be mentioned as examples chloroform, carbon tetrachloride, cyclohexane, trichloroethane, tetrachloroethylene, silicone tetrachloride, and nitromethane. Of those compounds, chloroform and carbon tetrachloride are preferred for reasons of stability and safety.

On the contrary, if a solvent having a large radical solvation effect such as tert-butylbenzene, cumene and xylene is used, tertiary carbon atom-chlorine bonds increase with the result that heat resistance of chlorinated ethylene-α-olefin copolymer rubber is impaired.

The reaction temperature is preferably 70° C. or higher, the optimal specific temperature depending on the kind of solvent. If the chlorination is caused to take place at an excessively low temperature, tertiary atom-chlorine bonds increase with the result that heat resistance is impaired. On the other hand, if the selected reaction temperature is very high, such process requires a highly costly reactor and its ancillary facilities, which are by no means practical.

The reactant concentration is preferably 60 g-polymer/1-solvent, while the optimal concentration depends on the molecular weight of the raw material ethylene-α-olefin copolymer rubber. If the concentration is too low, tertiary carbon atom-chlorine bonds increase with the result that heat resistance is impaired. On the other hand, if the concentration is too high, the solution is no longer handled conveniently, hence unpractical.

The chlorinated ethylene-α-olefin copolymer rubber is characterized in that compared with known conventional chlorinated ethylene-α-olefin copolymer rubber, it has a high vulcanization speed and excellent processibility, besides having excellent heat resistance and heat aging resistance.

The chlorinated ethylene-α-olefin copolymer rubber of the present invention can be used as a thermoplastic rubber in its unvulcanized state. Since unvulcanized chlorinated ethylene-α-olefin copolymer rubber has a good flexibility and excels in melt flow property, it can be easily blended with various types of resin. For example, it can be used effectively to improve the impact strength of vinyl chloride resin, polystyrene, AB resin, and ABS resin, and as a non-migrating plasticizer for soft or semirigid vinyl chloride resin and a flame retardant for polyolefins, such as polyethylene and polypropylene.

Vulcanization

Properties of the chlorinated ethylene-α-olefin copolymer rubber of the present invention come into full play in the vulcanized state. The vulcanizate is manufactured by first preparing an unvulcanized compounded rubber and vulcanizing it after it has been given shape into the compounded rubber according as designed. As a means to vulcanize said rubber, there can be mentioned as the effective vulcanization methods triazine vulcanization, organic peroxide vulcanization, and vulcanization using a phenolic vulcanizing agent.

In the triazine vulcanization, a triazine compound represented by the following general formula (1) is used as the vulcanizing agent.

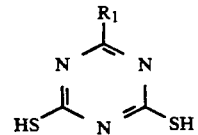

wherein $R_1$ stands for $-NR_2R_3$, $-OR_2$ or $-SR_2$. $R_2$ and $R_3$ represents a hydrogen atom, unsubstituted or substituted alkyl group, or unsubstituted or substituted aryl group, respectively.

As examples of such triazine compounds represented by the aforementioned general formula (1), there can be mentioned specifically triazine-2,4,6-trithiol, 2-dibutylaminotriazine-4,6-dithiol, 2-phenylaminotriazine-4,6-dithiol, 2-hexylaminotriazine-4,6-dithiol, 2-diethylaminotriazine-4,6-dithiol and 2-butoxytriazine-4,6-dithiol. These compounds are blended with chlorinated ethylene-α-olefin copolymer rubber at the ratio of between $5.0 \times 10^{-4}$ and $5.0 \times 10^{-2}$ mole, or preferably between $1.5 \times 10^{-3}$ and $2.0 \times 10^{-2}$, or still more preferably between $3.0 \times 10^{-3}$ and $1.3 \times 10^{-2}$, per 100 g of chlorinated ethylene-α-olefin copolymer rubber.

In case the quantity of vulcanizing agent added is less than said range, a vulcanizate having a suitable rubber elasticity can not be obtained, and if the quantity is in excess of said range, the elongation tends to decrease to the extent that the obtained rubber is no longer suitable for practical use.

In case a triazine compound is used as a vulcanizing agent, it is preferable that an organic salt having an acid dissociation constant (pKa) of 7 or more, or an onium salt of such compound which is capable of producing an organic salt is used either singularly or are used in combination.

There can be mentioned as examples of such vulcanization accelerators the following compound: 1,8-diazabicyclo(5,4,0)undecene-7, laurylamine, benzylamine, dibenzylamine, N-methylmorpholine, dicyclohexylamine, zinc dibutyldithiocarbamate, pentamethylenedithiocarbamyl-piperidine salt, N-cyclohexyl-2-benzothiazolesulfenamide, dicyclohexylamine benzoate, piperidine benzoate, dipentamethylenethiuram tetrasulfide (DPTT), tetramethylthiuram disulfide, tetramethylphosphonium iodide, tetramethylammonium chloride, tetrabutylphosphonium bromide, tetrabutylammonium bromide, distearyldimethylammonium chloride.

The quantity of said vulcanization accelerator is generally between $5 \times 10^{-4}$ and $2 \times 10^{-2}$ mole, or preferably between $1 \times 10^{-3}$ and $1 \times 10^{-2}$ mole for 100 g of chlorinated ethylene-α-olefin copolymer rubber.

In case of the organic peroxide vulcanization, there can be mentioned as examples of vulcanization agent dicumylperoxide, 2,5-dimethyl-2,5-di(tertiary butylperoxy)hexane, 2,5-dimethyl-2,5-di(benzoylperoxy)hexane, 2,5-dimethyl-2,5-di(tertiarybutylperoxy)hexine-3, ditertiarybutylperoxide, di-tertiarybutylperoxy-3,3,5-trimethylcyclohexane, and tertiarybutylhydroperoxide. Among those compounds mentioned above, dicumylperoxide, di-tertiarybutylperoxide, and di-tertiarybutylperoxy- o 3,3,5-trimethylcyclohexane are preferred. The quantity of organic peroxide used is ordinarily between $5.0 \times 10^{-4}$ and $5.0 \times 10^{-2}$, or preferably between $1.0 \times 10^{-3}$ and $3.0 \times 10^{-2}$, per 100 g of chlorinated ethylene-60 -olefin copolymer rubber.

Among those organic peroxide as the vulcanizing agent, sulfur; quinone dioxime (CDO), such as p-quinone dioxime; methacrylate, such as polyethyleneglycoldimethacrylate; allyl compounds, such as diallyl phthalate and triallyl cyanurate; maleimide compounds; and divinyl benzene are preferred. The quantity of such vulcanization chemical used is between ½ and 2 mole per 1 mole of organic peroxide, or preferably equal mol. In this case, to accelerate decomposition of organic peroxide, a decomposition accelerator may be used, such as tertiary amine like triethylamine, tributylamine, 2,4,6-tris(dimethylamino)phenol; and naphthenic acid salt of aluminum, cobalt vanadium, copper, calcium, zirconium, manganese, magnesium, lead and mercury.

There can be mentioned as the phenolic vulcanizing agent reactive phenolic resins produced by condensation of substituted phenol or unsubstituted phenol with aldehyde in an alkaline solvent, or condensation of bifunctional phenoldialcohols. Particularly, reactive halogenated phenolic resin, particularly reactive brominated phenolic resin having a bromium content between 2 and 10 % by weight, is preferred. Such phenolic vulcanizing agent is used generally at the ratio of 3 to 20 weight parts, particularly 5 to 15 weight parts, per 100 weight parts of chlorinated ethylene-α-olefin copolymer rubber.

Reactive phenolic resin such as said reactive brominated phenolic resin is readily available commercially. For example, there are available on market such reactive resins as "SP-1045", "CRJ-352", "SP-1055" and "SP-1056" manufactured by Schenectady Chemical.

In case reactive phenolic resin is used as a vulcanizing agent, it is preferable that a metal oxide be used to substantially increase the crosslink density (the degree of vulcanization). This metal oxide acts as a scavenger of hydrogen halide.

There can be mentioned as examples of such metal oxides iron oxide, titanium oxide, magnesium oxide, magnesium silicate, silicon dioxide, and zinc oxide. In cases where vulcanization cannot be readily accomplished using a reactive phenolix resin, it is desirable that a halogen donar be used in addition to said metal oxides, particularly zinc oxide.

There can be mentioned, as examples of the halogen donar, metal chlorides such as stannous chloride and ferric chloride, and halogen donar polymers such as chlorinated polyethylene, chlorinated paraffin, chlorosulfonated polyethylene, and polychlorobutadiene (Neoprene rubber).

Detailed description of halogen donars for reactive phenolic resin vulcanizing agent and systems used with metal oxides are given in "Vulcanization and Vulcanizing Agents", author: Werner Hoffmann.

Composition of Vulcanized Rubber

The chlorinated ethylene-α-olefin copolymer rubber of the present invention is offered to various applications as a vulcanized rubber composition compounded with said vulcanizing agent and vulcanization auxiliary chemical.

This composition gives rubber products having high vulcanization speed, and excellent processibility and heat stability, particularly excelling in strength, rubber elasticity, heat aging resistance, weatherability and durability.

To this vulcanized rubber composition, there can be added known compounding ingredients, for example, reinforcing filler, filler, softener, metallic activator, compounds having the oxymethylene structure, scorch preventive, antioxidant and process aids.

Various kinds of carbon blacks such as SRF (semi-reinforcing furnace; N762), GPE, FEF, MAF, HAF (high-abrasion furnace; N330), ISAF (intermediate super-abrasion furnace; N220), SAF (super-abrasion furnace; N110), FT and MT, and silicic acid in fine powder form may be used.

These reinforcing fillers are added at a ratio of 300 weight parts or less, or preferably 150 weight parts or less per 100 weight parts, of chlorinated ethylene-60 -olefin copolymer rubber.

As fillers, for example, light calcium carbonate, heavy calcium carbonate, talc and clay are used. For coloring, inorganic pigment and organic pigment are used.

These fillers and softeners are added at a ratio of 300 weight parts or less, or preferably 150 weight parts or less, per 100 weight parts of chlorinated ethylene-α-olefin copolymer rubber.

As softeners, there can be mentioned petroleum-based substances such as process oil, lubricating oil, paraffin, liquid paraffin, petroleum asphalt, and Vaseline; coal tars such as coal tar, and coal tar pitch; fatty oil such as caster oil, linseed oil, rape seed oil, soy-bean oil, and coconut oil; waxes, such as tall oil, beeswax, carnauba wax, lanolin; fatty acids, such as ricinoleic acid, palmitic acid, stearic acid, barium stearate, calcium stearate, or their metallic salts; synthetic polymeric materials, such as petroleum resin, coumarone-indene resin, and atactic polypropylene; ester-based plasticizers, such as dioctylphthalate, dioctyl adipate and dioctyl sebacate; microcrystalline wax; sub(factis); liquid polybutadiene; modified polybutadiene; and liquid thiocol.

These softeners are added adequately at a ratio of 200 weight parts or less, or preferably 70 weight parts or less, per 100 weight parts of chlorinated ethylene-α-olefin copolymer rubber. It is not desirable that the quantity of softener added exceeds 200 weight parts, since rubber elasticity, heat resistance, and heat aging resistance deteriorate in such case.

As metallic activators, magnesium oxide, zinc soap of higher fatty acid minium (red lead), litharge, lead oxide, calcium oxide may be used. These metallic activators are preferably used in a quantity falling in the range of 3 to 15 weight parts, or preferably 5 to 10 weight parts, per 100 weight parts of chlorinated ethylene-α-olefin copolymer rubber.

Addition of a compound having the oxyethylene structure or a scorch preventive is recommended to cope with various types of rubber processing procedures.

There can be mentioned as examples of such compounds having the oxyethylene structure ethylene glycol, diethylene glycol, polyethylene glycol, propylene glycol and polypropylene glycol. These compounds are usually used in a quantity equivalent to 0.1 to 10 weight parts, or preferably 1 to 5 weight parts, of chlorinated ethylene-α-olefin copolymer rubber. As scorch preventive, known scorch preventing agents may be used. As examples of such scorch preventives, there can be mentioned maleic anhydride, thioimide compounds, sulphenamide compound and sulfonamide compounds. The aforementioned components are used in a quantity equivalent to 0.2 to 5 weight parts, or preferably 0.3 to 3 weight parts, per 100 weight parts of chlorinated ethylene-α-olefin copolymer rubber. And, it is possible to extended the service life of chlorinated ethylene-α-olefin copolymer rubber by use of antioxidant as is the case with the conventional rubber. As examples of the antioxidants used in such case, there can be mentioned secondary aromatic amines, such as phenylnaphthylamine, N,N'-di-2-naphthyl-p-phenylene-diamine; phenolic stabilizers, such as dibutylhydroxytoluene, tetrakis[methylene(3,5-di-t-butyl-4-hydroxy)hydroxinenamate.]methane; thioether stabilizer, such as bis-2-methyl-4-(3-n-alkylthiopropionyloxy)5-t-butylphenyl] sulfide; dithiocarbamate stabilizers, such as nickel dibutyldithio carbamate, which are used either singularly or in combination.

The amount to be used of said antioxidants is determined at a ratio of generally 0.1 to 5 weight parts, or preferably 0.5 to 3 weight parts, per 100 weight parts of chlorinated ethylene-α-olefin copolymer rubber.

Next, such processing aids that are used for processing the conventional rubber may be used. As such processing aids, there can be mentioned as examples higher fatty acids, their salts and esters such as licinolic acid, stearic acid, parmitic acid, laurinic acid, barium stearate, calcium stearate, zinc stearate, and esters of said acids. These processing aids are used in a quantity up to about 10 weight parts or preferably about 1 to 5 weight parts, per 100 weight parts of chlorinated ethylene-α-olefin copolymer rubber.

The aforementioned reinforcing agents, fillers, pigments and softeners added to chlorinated ethylene-α-olefin copolymer rubber have been mixed with chlorinated ethylene-α-olefin copolymer rubber for about 3 to 10 minutes at about 80 to 170 ° C. by a Banbury mixer or the like, vulcanizing agent and vulcanization auxiliary chemical are added to the formed coherent material and the compound is mixed on the mill rolls like open rolls. The compound is mixed for about 5 to 30 minutes at a roll temperature of about 40 to 80° C. and when the mixing cycle is completed, the compound is obtained in the ribbon form or the sheet form. Or, pellet-form rubber compound may be prepared by directly feeding chlorinated ethylene-α-olefin copolymer rubber and compounding ingredients into an extruder maintained at about 80 to 100° C. and controlling the residence time to about 0.5 to 5 minutes.

Unvulcanized rubber compound thus prepared is formed into a desired form by, for example, extruders, calender rolls or compression press, and is vulcanized simultaneously with molding or in a vulcanizer by heating the vulcanizate to ordinarily about 150 to 270° C. for about 1 to 30 minutes in vulcanizing tank. As vulcanizing tanks, steam cure autoclaves, hot-air ovens, fluidized beds consisting of glass beads, a molten salt immersion tank, a microwave vulcanization tank are used either singularly or in combination.

Vulcanizates by thermselves, too, are used for electrical insulating materials, automotive parts, rubber-made industrial parts, earthworks and building materials and rubber-lined cloth.

Moreover, blowing agents and, if necessary, auxiliary chemicals for blowing agents may be added to the rubber compounds before the vulcanization step for the production of foamed vulcanizate which can be offered to such applications as heat insulation material, cushion, sealing material, and electrical insulating material.

There can be mentioned as specific examples of such blowing agents: inorganic blowing agents, such as sodium bicarbonate, sodium carbonate and sodium nitrite; nitroso compounds, such as N,N'-dimethyl-N,N'-dinitrosoterephthalamide, and N,N'-dinitrosopentamethylenetetramide; azo compounds, such as azodicarbonamide, azobisisobutylonitrile, azocyclohexylnitrile, azadiaminobenzene and barium azadicarboxylate; sulfonylhydrozide compounds, such as benzene sulfonylhydrazide, toluene sulfonylhydrazide, P,P'-oxy-bis(benzenesulfonylhydrazide), and diphenylsulfon-3,3'-disulfonylhydrazide; azide compounds, such as calcium azide, 4,4'-diphenyldisulfonylazide, and p-toluenesulfonylazide. In particular, nitroso compounds, azo compounds and azide compounds are preferred.

These blowing agents are added in a quantity equivalent to usually 0.5 to 30 weight parts, or preferably about 1 to 20 weight parts, per 100% by weight of chlorinated ethylene-α-olefin copolymer rubber, and in general form cellular bodies having an apparent density of about 0.03 to 0.7.

As blowing auxiliary chemicals which can be used along with the blowing agent, organic acids, such as salicylic acid, phthalic acid, and stearic acid or urea or its derivatives are used. They exhibit such effects as lowering of the decomposition temperature of the blowing agent, acceleration of decomposition and uniform dispersion of foams.

In case of the aforementioned vulcanized rubber compound, elastomeric composition having excellent processibility can be obtained by using crystalline polyolefin resin along with chlorinated ethylene-α-olefin copolymer rubber.

This crystalline polyolefin resin comprises a crystalline high molecular weight solid product obtained by polymerizing either one or more kinds of monoolefin by the high pressure process or the low pressure process. As examples of such resin, there can be mentioned isotactic or syndiotactic olefin polymer resins.

Representative resins of said category are commercially available.

As specific examples of suitable raw material olefins, there can be mentioned ethylene, propylene, 1-butene, 1-pentene, 1-hexene, 2-methyl-1-propene, 3-methyl-1-pentene, 4-methyl-1-pentene , 5-methyl-1-hexene, 1-octene and 1 decene, which are used either singularly or in combination.

As to whether the random type or the block type of copolymerization, any type of polymerization may be adopted so long as resinous material can be obtained.

Peroxide decomposition type crystalline polyolefin resin is suitably used as said crystalline polyolefin resin of the present invention. What is meant by the peroxide decomposition type crystalline polyolefin resin as mentioned above is such crystalline polyolefine resin which is thermally decomposed when it is mixed with peroxide and mixed as a mixture, thereby reducing its molecular weight and having its fluidity increased. As examples of such crystalline polyolefin resin, there can be mentioned copolymer of isotactic polypropylene or propylene with a small amount of α-olefin, such as propylene-ethylene copolymer, propylene-1-butene copolymer, propylene-1-hexene copolymer, propylene-4-methyl-1-pentene copolymer.

Preferred crystalline polyolefin resins are those having a melt index (ASTM D 1238-65T, 230° C) of 0.1 to 50, or preferably 5 to 20.

Crystalline polyolefin resin has a function of increasing the fluidity and heat resistance of the composition.

The crystalline polyolefin resin of the present invention is used at a ratio of 10 to 90 weight parts or preferably 10 to 60 weight parts, per 100 weight parts of both crystalline polyolefine resin and chlorinated ethylene-α-olefin copolymer rubber combined. Such elastomer composition is obtained by dynamic heat treatment after mixing fillers and compounding ingredients. The dynamic heat treatment as used herein means masticating the compound under high shear forces.

It is desirable that the dynamic heat treatment is carried out in a closed chamber. It is also desirable that it is carried out in inert atmosphere, such as of nitrogen and carbon dioxide, maintained in the temperature range of from the melting point of the crystalline polyolefin resin to 300° C., usually between 150 and 280° C., or preferably between 170 and 225° C.

The mixing (mastification) time is ordinarily 1 to 20 minutes, or preferably 1 to 10 minutes. The applied shear force is, as expressed in the shear rate, usually 10 to $10^4$ sec$^{-1}$, or preferably $10^2$ to $10^3$ sec$^{-1}$.

As the mixing equipment, mixing rolls, an internal mixer, such as Banbury mixer, a kneader, and a single-screw or a double-screw extruder can be used, although a closed type equipment is preferable.

By the aforementioned heat treatment, vulcanization of chlorinated ethylene-α-olefin copolymer rubber is carried out. The degree of such dynamic heat treatment is controlled at a level such that the gel content as determined by the following method is 20% or more, or preferably 45% or more, or most desirably 70% or more.

Measurement of the gel content 100 mg of thermoplastic elastomer sample is measured out, and is cut into 0.5 mm × 0.5 mm × 0.5 mm fine pieces to be dissolved into 30 ml of hot xylene solvent. The dissolved sample is filtered through a 325 mesh stainless screen. The gel substance deposited on the filter is dried at room temperature for 72 hours or longer until its weight reaches a constant level.

The "calibrated final weight (Y)" is calculated by deducting from the weight of this dried residue the weight of the components insoluble in hot xylene other the polymer components. On the other hand, the weight of chlorinated ethylene-α-olefin copolymer rubber in the sample is "the calibrated initial weight (X)". Then, the gel content is calculated by the following equation;

$$\frac{\text{Gel content}}{(\% \text{ by weight})} = \frac{\text{Calibrated final weight (Y)}}{\text{Calibrated initial weight (X)}} \times 100$$

Said thermoplastic elastomer composition has excellent moldability and processibility and, therefore, can be molded by the conventional molding machines used for thermoplastic thus making itself a suitable material for extrusion, calendering, and injection molding.

Said thermoplastic elastomer composition, which excels in oil resistance, flame retarding property, rubber elasticity, and heat aging resistance, can be suitably used for automotive applications (bellows, tubes, interior sheets, mudguard and weather strips); industrial parts (high pressure hose, gasket, diaphragm, rolls and packing); electric cable; cable sheathing; electric-electronic parts; building materials, gasket and sealing materials for earthwork roofing sheet, and waterproofing sheet.

EXAMPLES

The present invention will now be described in detail with reference to the following examples and comparative examples that by no means limit the scope of the invention.

EXAMPLE 1

Ethylene-1-butene copolymer rubber was polymerized according to a known method. By measurement by $^{13}C$ NMR analysis of this copolymer rubber, the mol ratio of ethylene units to 1-butene units was determined to be 90/10. Next, the intrinsic viscosity η of the copolymer rubber in decalin maintained at 135° C was measured. [η] thus measured was 1.5 dl/g.

300 g of this copolymer rubber and 1.8 mmol of t-butyl-peroxyoctoate (organic peroxide) were dissolved in 5 l of chloroform. The solution was placed in an autoclave equipped with an agitator and thermometer. While maintaining the reactant liquid at 70° C., chlorine gas was introduced into the reactor at a flow rate of 2 g/minute, and the reaction was continued for 3 hours. Subsequently, nitrogen gas was introduced into the reactor to purge chlorine gas and hydrogen chloride remaining in the system. Next, the reaction product was concentrated in an evaporator, and furthermore dried in a vacuum drier under reduced pressure for 48 hours to thoroughly remove the solvent.

Properties of the obtained chlorinated ethylene-α-olefin copolymer rubber were measured according to the following procedure. Moony viscosity $ML_{1+4}$ (121° C.)

The Mooney viscosity of said rubber was measured according to JIS K 6300 using a Mooney visiometer MSV 200 manufactured by Shimazu Co.

Chlorine content

The chlorine content of said rubber was measured by the bomb combustion method.

Distribution of combined chlorine 0.1 g of chlorinated ethylene-α-olefin copolymer rubber was dissolved in 5 ml of waterfree tetrahydrifuran and 100 mg of lithiumaluminum deuteride was added to the solution and the mixture was left to stand in an autoclave maintained at 100° C. for 3 weeks. The obtained reactant was treated with dilute hydrochloric acid, and its polymer content was extracted with benzene. The extract thus obtained was dried with magnesium sulfate and was filtered. Then, the obtained substance had its solvent content removed in a vacuum drier.

The obtained polymer was measured by $^{13}C$ NMR for the distribution of combined chlorine.

Thermal stability

The temperature level at which thermal shrinkage starts was determined using a thermal analysis instrument manufacture by Shimazu Co. Test conditions were in air atmosphere and a temperature elevation speed of 30° C./minute.

Next, compounded rubber and vulcanized rubber were prepared and subjected to a test. First, compounds were prepared according to the recipe set forth in Table 1 using 8 inch open-rolls (manufactured by Nippo Rolls). The time required for mixing was 15 minutes.

TABLE 1

| Ingredients | weight parts |
|---|---|
| Chlorinated ethylene-1-butene copolymer rubber | 100.0 |
| Stearic acid | 1.0 |
| magnesia (1) | 5.0 |
| FEF carbon (2) | 50.0 |
| naphthene-based process oil (3) | 20.0 |
| ZISNET-DB | 2.0 |
| Piperidine benzoate | 3.5 |

(1) Tradename: Kyowa Mag 150, manufactured by Kyowa Kagaku Kogyo Co.
(2) Tradename: Seast SO, manufactured by Tokai Carbon Co.
(3) Tradename: Sunthen 4240, manufactured by Nippon Sun Oil Co.
(4) Dibutylaminotriazine 2,4-dithiol, manufactured by Sankyo Kasei Co.

This compound was sheeted out in 5 mm thickness. Using the obtained sheet, the Mooney scorch time (ts), which is an indicator of the vulcanization speed, was determined according to JIS K 6300, from said sheet, a vulcanized sheet of 2 mm thickness was produced by a compression press (150 ton vulcanization press manufactured by Kotaki Co.)

The operating conditions were 160 ° C. and 20 minutes.

Said vulcanized sheet was measured according to JIS K 6301 for the spring type (Durometer) hardness test (type A) (Hs JIS A), tensile strength (TB), elongation (EB) and permanent set (PS).

Furthermore, after having left the test specimen of the vulcanized sheet to stand in an air oven maintained at 150° C. for 70 hours, the specimen was measured for the tensile strength retention ratio (AR (TB)) and the elongation retention ratio (AR(EB)) according to JIS K 6301.

Test results are shown in Table 2.

EXAMPLE 2

Tests were carried out in the same manner as in Example 1 except that instead of ethylene-1-butene copolymer rubber as the raw material which was used in Example 1, the following ethylene-1-butene copolymer was used.
Ethylene units/1-butene units (mol ratio) =87/13
Intrinsic viscosity [η]: 1.6 dl/g
Test results are shown in Table 2.

EXAMPLE 2

Tests were carried out in the same manner as in Example 1 except that instead of ethylene-1-butene copolymer rubber as the raw material which was used in Example 1, the following ethylene-1-butene copolymer was used.
Ethylene units/1-butene units (mol ratio) =93/7
Intrinsic viscosity [η]: 1.5 dl/g
Test results are shown in Table 2.

EXAMPLE 4

Tests were carried out in the same manner as in Example 1 except that the chlorination reaction time was set at 3 hours 25 minutes.
Test results are shown in Table 2.

EXAMPLE 5

Tests were carried out in the same manner as in Example 1 except that the chlorination time was set at 2 hours 40 minutes.
Tests results are shown in Table 2.

EXAMPLE 6

Tests were carried out in the same manner as in Example 1 except that instead of ethylene-1-butene copolymer rubber as the raw material which was used in Example 1, the following ethylene-1-butene copolymer was used.
Ethylene units/1-butene units (mol ratio) =90/10
Intrinsic viscosity [η]:2.3 dl/g
Test results are shown in Table 2.

EXAMPLE 7

Tests were carried out in the same manner as in Example 1 except that instead of ethylene-1-butene copolymer rubber as the raw material which was used in Example 1, the following ethylene-1-hexene copolymer was used.
Ethylene units/1-hexene units (mol ratio) =90/10
Intrinsic viscosity [η]: 1.9 dl/g
Test results are shown in Table 2.

COMPARATIVE EXAMPLE 2

Tests were carried out in the same manner as in Example 1 except that instead of ethylene-1-butene copolymer rubber as the raw material which was used in Example 1, the following ethylene-propylene copolymer was used.
Ethylene units/propylene (mol ratio) =70/30
Intrinsic viscosity [η]:1.7 dl/g
Test results are shown in Table 2.

COMPARATIVE EXAMPLE 3

Tests were carried out in the same manner as in Example 1 except that instead of ethylene-1-butene copolymer rubber as the raw material which was used in Example 1, the following polyethylene was used.
Specific gravity=0.97
Intrinsic viscosity [η]:1.4 dl/g
Test results are shown in Table 2.

EXAMPLE 8

Tests were carried out in the same manner as in Example 1 except that the reaction solvent was tetracarbon chloride.
Test results are shown in Table 2.

EXAMPLE 9

Tests were carried out in the same manner as in Example 1 except that the reaction solvent was chlorobenzene.
Test results are shown in Table 2.

COMPARATIVE EXAMPLE 4

Test were carried out in the same manner as in Example 1 except that the reaction solvent was tertbutylbenzene and the reaction time was 3 hours 10 minutes.
Test results are shown in Table 2.

EXAMPLE 10

Tests were carried out in the same manner as in Example 1 except that light was radiated from a 20 Watt daylight color fluorescent lamp instead of the organic peroxide, and the reaction time was 3 hours 30 minutes.
Test results are shown in Table 2.

EXAMPLE 11

Tests were carried out in the same manner as in Example 8 except that the reaction temperature was 100°

C. and 1.3 mmol of Perbutyl was used as an organic peroxide.

Test results are shown in Table 2.

COMPARATIVE EXAMPLE

Tests were carried out in the same manner as in Example 1 except that the reaction solvent was chlorobenzene into which 100 g of copolymer rubber was dissolved, the reaction temperature was 25 °C., light was radiated from a 20 Watt daylight color fluorescent lamp instead of the organic peroxide, and the reaction time was 3 hours 30 minutes.

Test results are shown in Table 2.

Then, 100 weight parts of this pellet, 3 weight parts of magnesia (the tradename: Kyowa Mag 150, manufactured by Kyowa Kagaku Kogyo Co.), 0.4 weight parts of dibutylamino-triazine-2,4-dithiol (manufactured by Sankyo Kasei Co.) and 0.7 weight parts of piperidine benzoate were mixed with agitation in a Henschel mixer. After the mixing was complete, the obtained material was subjected to dynamic heat treatment using a continuous double-screw extruder under operating conditions of 220° C. and a residence time of 1 minute, and a thermoplastic elastomer composition was thereby obtained.

The obtained thermoplastic elastomer composition

TABLE 2

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Mooney viscosity | 41 | 43 | 38 | 61 | 31 | 128 | 72 | 51 | 110 |
| Chlorine content (w %) | 30 | 31 | 30 | 35 | 25 | 29 | 30 | 30 | 31 |
| Distribution of combined chlorine (w %) | | | | | | | | | |
| primary carbon atom-Cl bond | 1.1 | 1.4 | 0.9 | 1.3 | 0.9 | 1.2 | 1.0 | 1.2 | 1.1 |
| tertiary carbon atom-Cl bond | 0.7 | 0.9 | 0.6 | 0.8 | 0.6 | 0.7 | 0.6 | 2.1 | 2.2 |
| Thermal stability Temp. thermal decomposition initiated (°C.) | 235 | 234 | 240 | 232 | 238 | 236 | 239 | 198 | 195 |
| Vulcanization speed Mooney scorch test (125° C.) $t_s$ | 10.1 | 9.8 | 10.4 | 8.7 | 11.5 | 9.6 | 10.4 | 10.2 | 9.8 |
| Vulcanizate properties | | | | | | | | | |
| normal conditions Hs(JIS A) | 70 | 71 | 71 | 73 | 71 | 71 | 69 | 70 | 70 |
| TB (Kgf/cm$^2$) | 160 | 162 | 165 | 161 | 168 | 203 | 175 | 145 | 155 |
| EB (%) | 480 | 450 | 500 | 420 | 510 | 540 | 500 | 510 | 480 |
| PS (%) | 9 | 8 | 12 | 7 | 12 | 7 | 10 | 11 | 9 |
| Heat aging resistance (150° C.-70 hr) | | | | | | | | | |
| AR (TB) (%) | 90 | 92 | 90 | 85 | 92 | 91 | 89 | 61 | 58 |
| AR (EB) (%) | 75 | 71 | 77 | 70 | 75 | 76 | 77 | 31 | <20 |

| | Comparative Example 3 | Example 8 | Example 9 | Comparative Example 4 | Example 10 | Example 11 | Comparative Example 5 |
|---|---|---|---|---|---|---|---|
| Mooney viscosity | 29 | 43 | 40 | 38 | 38 | 47 | 38 |
| Chlorine content (w %) | 27 | 31 | 29 | 28 | 27 | 32 | 29 |
| Distribution of combined chlorine (w %) | | | | | | | |
| primary carbon atom-Cl bond | <0.1 | 1.1 | 0.7 | 0.3 | 0.7 | 1.0 | 0.3 |
| tertiary carbon atom-Cl bond | <0.1 | 0.8 | 1.4 | 2.0 | 1.4 | 1.0 | 2.1 |
| Thermal stability Temp. thermal decomposition initiated (°C.) | 250 | 235 | 229 | 193 | 221 | 232 | 195 |
| Vulcanization speed Mooney scorch test (125° C.) $t_s$ | >30 | 9.9 | 15.8 | 23.5 | 14.7 | 11.5 | 20.1 |
| Vulcanizate properties | | | | | | | |
| normal conditions Hs(JIS A) | 76 | 71 | 69 | 70 | 71 | 70 | 70 |
| TB (Kgf/cm$^2$) | 138 | 165 | 161 | 158 | 155 | 165 | 163 |
| EB (%) | 620 | 490 | 530 | 550 | 530 | 490 | 580 |
| PS (%) | 96 | 9 | 14 | 36 | 13 | 10 | 33 |
| Heat aging resistance (150° C.-70 hr) | | | | | | | |
| AR (TB) (%) | 95 | 88 | 81 | 65 | 83 | 89 | 40 |
| AR (EB) (%) | 85 | 75 | 60 | 35 | 62 | 70 | <20 |

EXAMPLE 12

After mixing 25 weight parts of polypropylene having the melt flow rate of 30 g/10 minutes (ASTM D 238-65T, 230° C.) and the density of 0.91 g/cm$^3$ (hereinafter referred to as "PP(1)") and 75 weight parts of chlorinated ethylene-1-butene copolymer rubber (hereinafter referred to as "Cl-rubber (1)") by a Banbury mixer in nitrogen atmosphere at 180° C, the stock was put through rolls and the obtained sheet was cut by a sheet cutter into cubic pellets.

was injection molded under the following conditions, and the molding was evaluated for its properties.

Molding conditions

Injection molding machine: Dynamelter, manufactured by Meiki Co.
Molding temperature: 220° C.
injection pressure:
  Primary pressure: 1,000 kg/cm$^2$
  Secondary pressure: 700 kg/cm$^2$
Injection speed: Maximum Injection cycle: 90 sec/cycle
Gate: Direct gate (land length: 10mm: width: 10mm: thickness: 3mm)
Molded part: Length: 150 mm: width: 120 mm: thickness: 3 mm)

Testing of Molded Parts (1) Hardness by the spring method (HS): The JIS A type method described in JIS K 6301.

(2) Oil resistance: The test specimen was immersed in ASTM No, 3 oil maintained at 121° C. for 70 hours.

The ratio of the volume before immersion to the volume after immersion, i.e. the swelling ratio (delta V%), was measured.

(3) Strength: The tensile strength at break at the stretching (crosshead) speed of 200 mm/minutes (TB kg/cm$^2$) was measured.

(4) Permanent set (PS): Residual strain at 100% elongation was measured according to JIS K 6301, and the ratio (%) of this residual elongation and the original strength was regarded as an indicator of rubber elasticity.

(5) Heat aging resistance: The test specimen was aged in a Geer oven maintained at 135 ° C. for 7 days. The ratio of the elongation at break aging to the elongation at break after aging (AR(EB)%) was measured.

Test results are shown in Table 3.

EXAMPLE 13

A thermoplastic elastomer composition was obtained in the same manner as in Example 12 except that the chlorinated ethylene-1-butene copolymer rubber obtained in Example 2 (hereinafter referred to as "Cl-rubber (2)") was used as the chlorinated rubber and the dosages of dibutylaminotriazine-2,4-dithiol and piperidine benzoate were 1.0 weight part and 1.0 weight part respectively, and the obtained molding was measured for its properties.

Test results are shown in Table 3.

EXAMPLE 14

A thermoplastic elastomer composition was obtained in the same manner as in Example 12 except that the chlorinated ethylene-1-butene copolymer rubber obtained in Example 4 (hereinafter referred to as "Cl-rubber (3)") was used as the chlorinated rubber and the dosages of magnesia, dibutylaminotriazine-2,4-dithiol and piperidine benzoate were 5 weight parts, 2 weight parts, and 3.5 weight parts respectively, and the obtained molding was measured for its properties.

Test results are shown in Table 3.

EXAMPLE 15

A thermoplastic elastomer composition was obtained in the same manner as in Example 12 except that the chlorinated ethylene-1-butene copolymer rubber obtained in Example 5 (hereinafter referred to as "Cl-rubber (4)") was used as the chlorinated rubber, polypropylene having the melt flow rate (ASTM D 1238-65T. 230 ° C.) of 10 g/10 minutes and the density of 0.91 g/cm$^3$ (hereinafter referred to as "PP(2)") was used instead of PP(1), 1.2 weight parts of 1,3-bis(t-butylperoxyisopropyl)benzene instead of dibutylaminotriazine-2,4-dithiol and 1 weight parts of divinylbenzene instead of piperidine benzoate were used, and the obtained molding was measured for its properties.

Test results are shown in Table 3.

EXAMPLE 16

A thermoplastic elastomer composition was obtained in the same manner as in Example 12 except that 35 weight parts of PP (2) instead of 25 weight parts of PP (1) and 65 weight parts of Cl-rubber (4) instead of 75 weight parts of Cl-rubber (1) were used: 50 weight parts of naphthene-based process oil (the tradename: Sunthen 4240, manufactured by Nippon Sun Oil Co.) (hereinafter referred to as "Softener (1)") and 50 weight parts of dioctylphthlate (hereinafter referred to as "Softener (2)") were additionally used: and 5 weight parts of zinc oxide instead of magnesia, 12 weight parts of alkylphenol resin (the tradename: Hitanol 2501, manufactured by Hitachi Kasei Kogyo Co.) instead of dibutylaminotriazine-2,4-dithiol and a weight part of stannous chloride (SnCl$_2$.2H$_2$O) instead of piperidine benzoate were used, and the obtained molding was measured for its properties.

Test results are shown in Table 3.

EXAMPLE 17

A thermoplastic elastomer composition was obtained in the same manner as in Example 14 except that 20 weight parts of clay ( the tradename: Dixie Clay, manufactured by R.T. Vanderbilt) was used as an inorganic filler and 80 weight parts of Softener (1) was used, and the obtained molding was measured for its properties.

Test results are shown in Table 3.

EXAMPLE 18

A thermoplastic elastomer composition was obtained in the same manner as in Example 17 except that 40 weight parts of Softener (1) and 40 weight parts of Softener (2) were used instead of 80 weight parts of Softener (1), and the obtained molding was measured for its properties.

Test results are shown in Table 3.

EXAMPLE 19

A thermoplastic elastomer composition was obtained in the same manner as in Example 17 except that 80 weight parts of Softener (2) was used instead of 80 weight parts of Softener (1), and the obtained molding was measured for its properties.

Test results are shown in Table 3.

COMPARATIVE EXAMPLE 6

A thermoplastic elastomer composition was obtained in the same manner as in Example 15 except that chlorinated polyethylene having the Mooney viscosity (MS$_{1+4}$ (100° C.)) of 80 and the chlorine content of 35% by weight (hereinafter referred to as "Cl-PE") was used, and the obtained molding was measured for its properties.

Test results are shown in Table 3.

EXAMPLE 20

A thermoplastic elastomer composition was obtained in the same manner as in Example 14 except that 75 weight parts of Cl-rubber (3) and 25 weight parts of PP (1) along with 5 weight parts of antimony trioxide were mixed in a Banbury mixer, and the obtained molding was measured for its properties. Evaluation was made of the obtained molding as for its flame retarding property in addition to said properties.

Test results are shown in Table 3.

COMPARATIVE EXAMPLE 7

A thermoplastic elastomer composition was obtained in the same manner as in Examiner is except that instead of Cl-rubber (4) ethylene-propylene/5-ethylidene norbornene copolymer rubber having the Mooney viscosity $MS_{1+4}$ (100° C.) of 70, the mol ratio of the ethylene units to the propylene units (ethylene units/propylene units) of 70/30, the 5-ethylidene-2-norbornene content of 12 on the basis of the iodine number (hereinafter referred to as "EPDM") and additionally, 5 weight parts of antimony trioxide were used, and the obtained molding was measured for its properties.

Test results are shown in Table 3.

TABLE 3

| | Ex. 12 | Ex. 13 | Ex. 14 | Ex. 15 | Ex. 16 | Ex. 17 | Ex. 18 | Ex. 19 | Comp. Ex. 6 | Ex. 20 | Comp. Ex. 7 |
|---|---|---|---|---|---|---|---|---|---|---|---|
| Components | | | | | | | | | | | |
| PP(1) | 25 | 25 | 25 | | | 25 | 25 | 25 | | 25 | |
| PP(2) | | | | 25 | 35 | | | | 25 | | 25 |
| Cl-rubber (1) | 75 | | | | | | | | | | |
| Cl-rubber (2) | | 75 | | | | | | | | | |
| Cl-rubber (3) | | | 75 | | | 75 | 75 | 75 | | 75 | |
| Cl-rubber (4) | | | | 75 | 65 | | | | | | |
| Cl-PE | | | | | | | | | 75 | | |
| EPDM | | | | | | | | | | | 75 |
| Inorganic filler | | | | | | 20 | 20 | 20 | | | |
| Softener (1) | | | | | 50 | 80 | 40 | | | | |
| Softener (2) | | | | | 50 | | 40 | 80 | | | |
| Antimon trioxide | | | | | | | | | | 5 | 5 |
| Gel content | 45 | 75 | 98 | 98 | 97 | 98 | 97 | 99 | 97 | 98 | 97 |
| Properties | | | | | | | | | | | |
| Hardness Hs(JIS A) | 75 | 76 | 77 | 77 | 85 | 60 | 62 | 61 | 90 | 78 | 77 |
| Oil resistance ΔV (%) | 25 | 24 | 20 | 21 | 20 | 19 | 20 | 20 | 18 | 20 | 65 |
| Strength TB (Kg/cm$^2$) | 105 | 111 | 115 | 116 | 105 | 95 | 98 | 101 | 120 | 100 | 102 |
| Rubber elasticity PS (%) | 10 | 10 | 8 | 8 | 11 | 4 | 4 | 4 | 25 | 8 | 8 |
| Heat aging resistance AR (EB) (%) | 97 | 97 | 98 | 98 | 98 | 97 | 98 | 98 | 97 | 90 | 90 |
| Flame resistance | — | — | — | — | — | — | — | — | — | good | bad |

Ex. = Example
Comp. = Comparative

We claim:

1. Chlorinated ethylene-α-olefin copolymer rubber comprising 20 to 40% by weight of chlorine, based on weight of the chlorinated copolymer rubber, wherein 0.6% by weight or more of the chlorine is bonded to primary carbon atoms, and 1.6% by weight or less of the chlorine is bonded to tertiary carbon atoms, and having a Mooney viscosity $(ML_{1+4}$ (121° C.)) of 10 to 190.

2. Chlorinated ethylene-α-olefin copolymer rubber of claim 1 wherein the ratio of the ethylene units to the α-olefin units in ethylene-α-olefin copolymer rubber before chlorination in mol is 85/15 to 95/5.

3. Chlorinated ethylene-α-olefin copolymer rubber of claim 1 comprising α-olefin having a carbon number between 4 and 20.

4. A composition obtained by compounding chlorinated ethylene-α-olefin copolymer rubber of claim 1 with vulcanizing agent, reinforcing agent and softener.

5. The composition of claim 4 wherein the vulcanizing agents comprises triazine compound, organic peroxide or reactive phenolic resin.

6. The composition of claim 4 wherein the reinforcing agent is in an amount of 300 weight parts or less and the softener is in an amount of 200 weight parts or less, per 100 weight parts of chlorinated ethylene-α-olefin copolymer rubber.

7. Chlorinated ethylene-α-olefin copolymer rubber of claim 1 wherein the chlorine content of the copolymer rubber is determined by the combustion method.

8. The chlorinated ethylene-α-olefin copolymer rubber of claim 1, wherein the chlorinated ethylene -α-olefin copolymer comprises chlorinated ethylene-1-butene copolymer rubber or chlorinated ethylene-1-hexene copolymer rubber.

9. The composition of claim 5, wherein the vulcanizing agents comprises a triazine compound in an amount of $5.0 \times 10^{-4}$ to $5 \times 10^{-2}$ mole and an organic salt having an acid dissociation constant (PKa) of 7 or more, or an onium salt thereof in an amount of $5 \times 10^{-4}$ to $5 \times 10^{-2}$ mole per 100 g of the chlorinated copolymer rubber.

10. Chlorinate ethylene-α-olefin copolymer rubber of claim 1 wherein 0.6 to 1.4% by weight of the chlorine is bonded to primary carbon atoms, and 1.6 to 0.6% by weight of the chlorine is bonded to tertiary carbon atoms.

11. Chlorinated ethylene-α-olefin copolymer rubber of claim 1 comprising α-olefin having a carbon number between 4 and 12.

12. Chlorinated ethylene α-olefin copolymer rubber of claim 1 comprising α-olefin having a carbon number between 4 ad 6.

13. Chlorinated ethylene-α-olefin copolymer rubber of claim 1 comprising 25 to 35% by weight of chlorine, based on weight of the chlorinated copolymer rubber.

14. Chlorinated ethylene-α-olefin copolymer rubber of claim 1 having a Mooney viscosity $(ML_{1+4}(121°$ C.$))$ of 20 to 150.

15. Chlorinated ethylene-α-olefin copolymer rubber, said α-olefin is a member selected from the group of α-olefins consisting of 1-butene, 4-methylpentene-1, hexene, octene, decene and dodecene, comprising 20 to 40% by weight of chlorine, based on weight of the chlorinated copolymer rubber, the mol ratio of ethylene to α-olefin is 85/15 to 95/5, wherein 0.6% by weight or more of the chlorine is bonded to primary carbon atoms, and 1.6% by weight or less of the chlorine is bonded to tertiary carbon atoms, and having a Mooney viscosity $(ML_{1+4}$ (121° C.) of 10 to 190.

16. Chlorinated ethylene-α-olefin copolymer rubber, said α-olefin is a member selected from the group consisting of 1-butene and 1-hexene, comprising 25 to 35% by weight of chlorine based on weight of the chlorinated copolymer rubber, the mol ratio of ethylene to α-olefin is 85/15 to 95/5, wherein 0.6% by weight or more of the chlorine is bonded to the primary carbon atoms, and 1.6% by weight or less of the chlorine is bonded to tertiary carbon atoms and having a Mooney viscosity ($ML_{1+4}$ (121° C.) of 20 to 150.

17. Chlorinated ethylene-α-olefin copolymer rubber of claim 16 wherein 0.6 to 1.4% by weight of the chlorine is bonded to primary carbon atoms, and 1.6 to 0.6% by weight of the chlorine is bonded to tertiary carbon atoms.

* * * * *